No. 858,347. PATENTED JUNE 25, 1907.
H. M. MORRILL & F. A. RANDALL.
COMBINATION FARM RACK.
APPLICATION FILED JUNE 8, 1906.
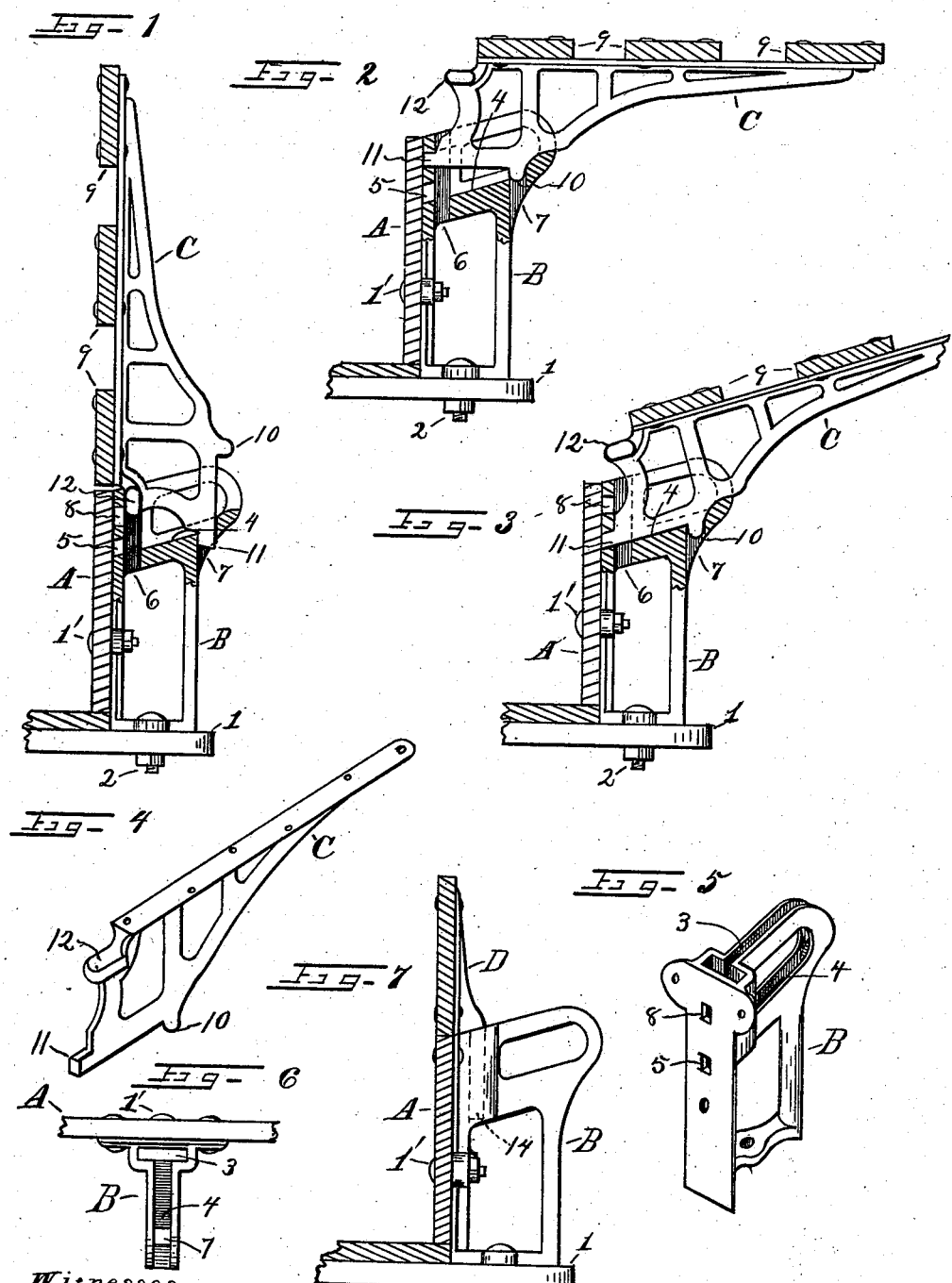

UNITED STATES PATENT OFFICE.

HENRY M. MORRILL AND FRED A. RANDALL, OF TEKONSHA, MICHIGAN.

COMBINATION FARM-RACK.

No. 858,347.      Specification of Letters Patent.      Patented June 25, 1907.

Application filed June 8, 1906. Serial No. 320,717.

*To all whom it may concern:*

Be it known that we, HENRY M. MORRILL and FRED A. RANDALL, citizens of the United States, and residents of Tekonsha, in the county of Calhoun and State of Michigan, have invented certain new and useful Improvements in a Combination Farm-Rack, of which we declare the following to be a full, clear, and exact description thereof, such as will enable others skilled in the art to which it appertains to make and use the same.

The object of the present invention is to provide a combination farm rack that will be very simple, capable of various adjustments, durable, economical of manufacture and thoroughly practical. As heretofore constructed, many combination racks have been very inconvenient when it came to shifting the rack from a vertical to a sloping or horizontal position, and vice versa, owing to the minute adjustment of the parts, and their novelty dependent on the several adjustments necessarily co-acting at one and the same time to produce a desired result.

Our invention has for its object, the overcoming of this difficulty, as will hereinafter be more thoroughly set forth in the following specification and be specifically pointed out in the claims.

Referring to the drawings forming a part of this specification, Figures 1, 2 and 3 represent a vertical, central section through a portion of a vehicle box with the box bracket partly in section, showing the rack arm in a vertical, horizontal and sloping position, respectively. Fig. 4 is a perspective view of a rack arm. Fig. 5 is a perspective view of a box bracket. Fig. 6 is a plan view of a box bracket attached to a box side, and Fig. 7 is a vertical, central section through a portion of a vehicle box with a box bracket attached and shows an auxiliary or independent top box attached.

Like marks of reference refer to corresponding parts throughout the several views.

A, represents the vehicle box, B, the box bracket, and C, the rack arm.

At either side of the vehicle box and at intervals of its length, the brackets B, are disposed, usually one being located at either end and two therebetween, the same being secured to the box by means of bolts or rivets, or both, as may be deemed expedient. The two central brackets are, usually, also supported by means of transverse sills 1 through which bolts 2 pass and secure the same, while the brackets at the box ends, especially the forward end, has no bottom bolt attachment. The box bracket B, in the preferred form, has a recessed, upper extremity within which the rack-arm is attached, and a side wall and base, through either of which bolts 1' and 2 are applied to secure the same to the vehicle box. Within the upper extremity of the box bracket is a horizontal, T-shaped recess or slot 3, the bottom, 4, of which, slopes downward toward the vehicle box, at which place a hole, 5, of the bracket is alined therewith, a hole, 6, bisecting the bottom, 4, and alined with the inner or vertical extremity of the slot 3. Near the opposite end of the sloping bottom a hole, 7, is provided, and above the hole 5, a secondary hole, 8, is made.

The rack-arm C, opposite to which the side boards, 9, are secured, has a lug, 10, and at its interlocking end a finger, 11, and a lug, 12. The lug, 12, protrudes from either side of the arm and is adapted to be received by the vertical, inner extremity of the T-shaped slot when the arm is employed for the purpose of a stock-rack, as shown in Fig. 1. In this position, also, the finger, 11, is adapted to fit within the hole, 7, to prevent the arm from vertical displacement.

In the position of the rack-arm when set sloping, as shown in Fig. 3, the finger, 11, of the arm fits within the hole 5 and the lug 10 within the hole 7, while the whole underbearing surface of the arm is received by the bottom, 4, of the bracket, affording a very firm support for the arm. The sloping bottom, 4, of the recess permits of the rack-arms being very easily and quickly slid into position, the finger, 11, of the arm sliding over its surface and automatically fitting the socket or hole, 5, while the lug, 10, prevents the arm from longitudinal displacement.

By the construction herein outlined and set forth, the arm C, is held in a very firm position at any of its working positions and while very easily and quickly disengaged, the same will not readily become unlocked through jolt or jar from driving over rough and uneven ground. In lieu of the arm C, a secondary arm D, may be employed when a narrow top-box attachment is desired, as shown in Fig. 7. This arm has a vertical shank, 14, similar in contour to the inner or vertical extremity of the slot, 3, into which it is adapted to be received when a top-box attachment is desired.

Having set forth our invention, what we claim as new and desire to secure by Letters Patent, is:

1. In combination with a vehicle-box and rack-boards, brackets attached to the vehicle-box, each of said brackets having at its upper extremity a horizontal, T-shaped slot with an inwardly and downwardly sloping bottom, said slot having holes intersecting both its vertical, inner wall and its bottom; arms to which the rack-boards are attached, each of said arms having lugs adapted to fit within the inner vertical extremity of the T-shaped slot and a finger adapted to fit within a hole near the outer extremity of said sloping bottom when said arm is in a vertical position, and a lug on the under side of said arm adapted to fit within the hole near the outer extremity of said sloping bottom and said finger adapted to fit within the holes intersecting the vertical wall of said T-shaped slot when in a horizontal or an inclined position, substantially as, and for the purpose set forth.

2. The combination of the box-bracket having a horizontal, T-shaped slot, 3, with an inwardly and downwardly sloping bottom, 4, having holes, the inner vertical extremity of said slot having the holes 5 and 8, an arm having the finger 11 and a lug 12, the lug 12 and the finger 11 adapted to fit the vertical, inner extremity of the T-shaped slot and the hole 7, respectively when said arm is in a vertical position, and the finger, 11, and lug, 10, adapted to fit within the holes 5 and 8 and the hole 7, respectively, when the arm is in a horizontal or sloping position, substantially as, and for the purpose set forth.

3. The combination of the box-bracket having a horizontal, T-shaped slot at its upper extremity provided with an inner, vertical, transverse extremity and a top-box arm having a shank adapted to fit within said vertical, transverse extremity, substantially as and for the purpose set forth.

HENRY M. MORRILL.
FRED A. RANDALL.

Witnesses:
H. W. CUSHMAN,
H. D. WARREN.